United States Patent
Nam et al.

(10) Patent No.: US 10,461,377 B2
(45) Date of Patent: Oct. 29, 2019

(54) METHOD FOR CONTROLLING CHARGE CAPACITY OF UPS BATTERY

(71) Applicant: LG CHEM, LTD., Seoul (KR)

(72) Inventors: Jung Hyun Nam, Cheongju-si (KR); Kyu Seong Lee, Sejong (KR); Bum Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/738,388

(22) PCT Filed: Aug. 4, 2016

(86) PCT No.: PCT/KR2016/008608
§ 371 (c)(1),
(2) Date: Dec. 20, 2017

(87) PCT Pub. No.: WO2017/039164
PCT Pub. Date: Mar. 9, 2017

(65) Prior Publication Data
US 2018/0175461 A1 Jun. 21, 2018

(30) Foreign Application Priority Data
Sep. 1, 2015 (KR) .................. 10-2015-0123490

(51) Int. Cl.
*H01M 10/44* (2006.01)
*H01M 10/48* (2006.01)
(Continued)

(52) U.S. Cl.
CPC ......... *H01M 10/443* (2013.01); *H01M 10/44* (2013.01); *H01M 10/48* (2013.01);
(Continued)

(58) Field of Classification Search
CPC ....... H01M 10/443; H01M 10/486; H02J 7/04
(Continued)

(56) References Cited

U.S. PATENT DOCUMENTS

| 7,880,438 | B1 |  | 2/2011 | Cohen et al. |
| 8,406,936 | B1 | * | 3/2013 | Borumand ............... H02J 1/14 700/286 |

(Continued)

FOREIGN PATENT DOCUMENTS

| JP | 2007-151329 A | 6/2007 |
| JP | 2013-9594 A | 1/2013 |

(Continued)

OTHER PUBLICATIONS

International Search Report issued in PCT/KR2016/008608 (PCT/ISA/210), dated Nov. 24, 2016.
(Continued)

*Primary Examiner* — Edward Tso
*Assistant Examiner* — Aaron Piggush
(74) *Attorney, Agent, or Firm* — Birch, Stewart, Kolasch & Birch, LLP (57) ABSTRACT

The present invention provides an apparatus and method for controlling the charging capacity of a battery to minimize battery damage, thereby enabling the battery to be used for a longer time. More specifically, the present invention provides a device and method for extending a battery life by reducing battery damage by controlling the charging capacity of the battery according to a temperature.

8 Claims, 7 Drawing Sheets

(51) Int. Cl.
*H02J 7/04* (2006.01)
*H02J 9/04* (2006.01)
*H02J 7/00* (2006.01)

(52) U.S. Cl.
CPC .......... *H01M 10/486* (2013.01); *H02J 7/007* (2013.01); *H02J 7/0091* (2013.01); *H02J 7/04* (2013.01); *H02J 9/04* (2013.01); *H02J 2007/0098* (2013.01)

(58) Field of Classification Search
USPC .................................. 320/134, 152; 700/295
See application file for complete search history.

(56) References Cited

U.S. PATENT DOCUMENTS

2002/0193953 A1* 12/2002 Hoenig ................ G01R 31/362
702/63
2010/0201326 A1* 8/2010 Takami ................ B60L 3/0046
320/152
2012/0331317 A1 12/2012 Rogers et al.

FOREIGN PATENT DOCUMENTS

| KR | 10-0145442 B1 | 10/1998 |
| KR | 10-2008-0103262 A | 11/2008 |
| KR | 10-2012-0046355 A | 5/2012 |

OTHER PUBLICATIONS

Dhameja, S., "Electric European Search Report Vehicle Battery Systems," REFEREX, 2002, pp. 46-48, 72-73, 98.
European Search Report for Appl. No. 16842130.3 dated May 30, 2018.

\* cited by examiner

METHOD FOR CONTROLLING CHARGE CAPACITY OF UPS BATTERY

TECHNICAL FIELD

The present invention relates to a method and device for controlling the charging capacity of a battery.

More particularly, the present invention relates to a method and device for controlling the charging capacity of a battery according to a temperature.

BACKGROUND ART

A UPS is an abbreviation of Uninterruptible Power Supply, and as a power device that normally keeps a battery in a fully charged state by receiving the commercial power or the generator power and when the power is lost, discharges the battery in order to continuously supply electricity to the load for a predetermined time without momentary power failure, is a device that always supplies the rated voltage and the rated frequency electricity to the load even if the voltage fluctuation and frequency fluctuation of the input power occur.

Batteries are used in such UPS devices, and since batteries used in UPS devices supply power to electronic devices when main power supplied to the electronic devices is interrupted, they remain fully charged for most of the time.

In a typical BMS, a battery fully charged state is determined based on the output voltage and current of a battery and the holding time of the output voltage and the current.

Figure 1:
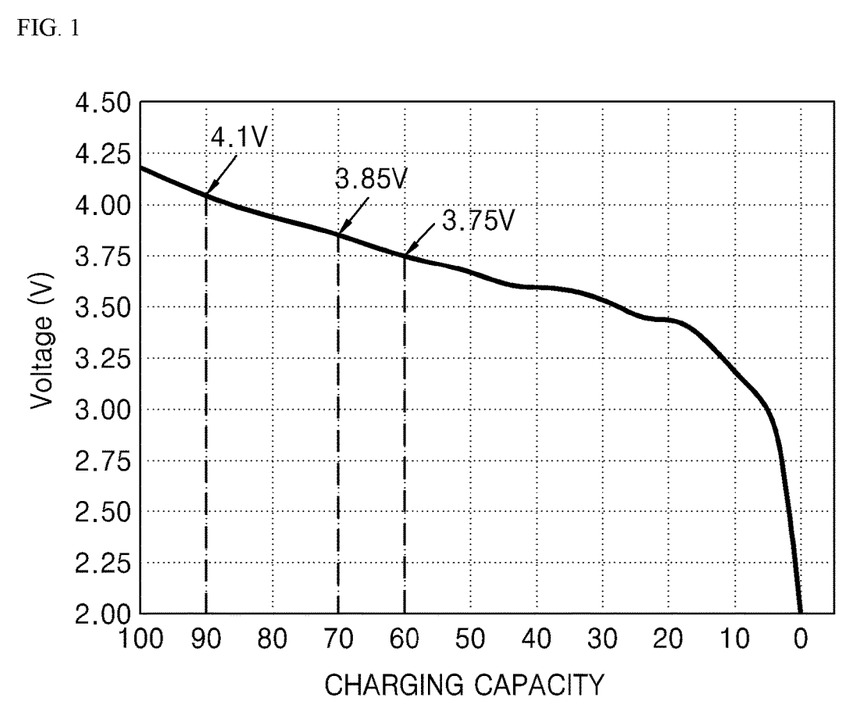
FIG. 1 is a graph illustrating an output voltage of a battery according to a charging capacity.

FIG. 1 is a graph illustrating an output voltage according to the charging capacity of a battery.

Referring to FIG. 1, it may be seen that the output voltage of the battery increases as the charging capacity increases.

On the other hand, even with the same battery, the charging capacity changes due to a chemical change inside the battery depending on a temperature.

Table 1 shows the charging and discharging capacity of a battery according to a temperature under the same conditions.

TABLE 1

| CHARGING TEMPERATURE | DISCHARGING TEMPERATURE (° C.) | | | | |
|---|---|---|---|---|---|
| (° C.) | −10 | 0 | 25 | 45 | 60 |
| −5 | 100% | 113% | — | — | — |
| 10 | 120% | 115% | 130% | — | — |
| 25 | 104% | 117% | 134% | 139% | 139% |
| 45 | — | — | 135% | 140% | 140% |
| 60 | — | — | — | 141% | 141% |

In the above table, when charging and discharging are performed at a high temperature, a charging capacity of more than 40% remains as compared with a low temperature.

In the case where the charging capacity of a battery remains, power may be supplied using the battery for a longer time than the specification but in the case where the battery maintains a full charge state, the charging capacity of the battery is exceeded, so that this shortens the lifetime of the battery.

DISCLOSURE

Technical Problem

The present invention provides an apparatus and method for controlling the charging capacity of a battery to minimize battery damage, thereby enabling the battery to be used for a longer time.

More specifically, the present invention provides a device and method for extending a battery life by reducing battery damage by controlling the charging capacity of the battery according to a temperature.

Technical Solution

According to a method of controlling a battery charging capacity according to a temperature, the method includes: a current temperature detection operation of measuring a current temperature; an optimal charging capacity detection operation of detecting an optimal charging capacity of a battery corresponding to each temperature; a current charging capacity detection operation of detecting a current charging capacity of the battery; a charging capacity comparison operation of comparing the optimal charging capacity with the current charging capacity; a charge/discharge determination operation of determining a charging/discharging of the battery according to a result of the charging capacity comparison operation; and a charge/discharge progress operation of charging/discharging of the battery according to a result of the charge/discharge determination operation.

The optimal charging capacity detection operation may include: a maximum charging capacity detection operation of detecting a maximum charging capacity for each predetermined temperature corresponding to a temperature; and a minimum charging capacity detection operation of detecting a minimum charging capacity for each predetermined temperature corresponding to a temperature.

The charge/discharge determination operation may transmit a signal for discharging the battery to a control unit if the current charging capacity of the battery is greater than the maximum charging capacity according to a result of the charging amount comparison operation, and transmit a signal for charging the battery to the control unit if the current charging capacity of the battery is less than the minimum charging capacity according to the result of the charging amount comparison operation.

According to a battery charging capacity controlling device according to a temperature, the device includes: a control unit configured to control a charging capacity of a battery; a memory configured to store an optimal charging capacity table corresponding to a temperature; and a measurement unit configured to measure a temperature and a current charging capacity of the battery.

The control unit may include: a comparison unit configured to compare the optimal charging capacity table with the current charging capacity of the battery; and a charge/discharge control switch configured to control the battery to be in a charge or discharge state according to a result of the comparison unit.

The measurement unit may include: a temperature measurement module configured to measure a temperature and heat of the battery; and a charging capacity measurement module configured to measure the current charging capacity of the battery.

According to a battery fully-charged voltage condition controlling device according to a temperature, the device includes: a control unit configured to control a charging capacity of a battery; a memory configured to store an optimal charging capacity table corresponding to a temperature; and a temperature measurement module configured to measure a temperature and heat of the battery; and a communication unit configured to receive a current charging capacity of the battery in communication with a BMS.

The control unit may include: a comparison unit configured to compare the optimal charging capacity table with the current charging capacity of the battery; and a charge/discharge control switch configured to control the battery to be in a charge or discharge state according to a result of the comparison unit.

Advantageous Effects

The present invention may extend a battery life by reducing battery damage by controlling the charging capacity of the battery to be suitable for a temperature.

MODE FOR INVENTION

The present invention relates to a device and method for controlling the charging and discharging of a battery for UPS.

Hereinafter, exemplary embodiments of the present invention will be described in more detail with reference to the contents described in the accompanying drawings. However, the present invention is not limited or restricted to exemplary embodiments. Like reference numerals in each drawing represent members for performing the same function substantially.

Although the terms "first," "second," etc., may be used herein to describe various elements, these elements should not be limited by these terms. The above terms are used only to distinguish one component from another. For example, a first component may be referred to as a second component and vice versa without departing from the scope of the inventive concept. Terms used in this specification are used to describe specific embodiments, and are not intended to limit the scope of the inventive concept. The singular expressions include plural expressions unless the context clearly dictates otherwise.

Terms used in this specification may be currently widely used general terms in consideration of functions in the present invention but may vary according to the intents of those skilled in the art, precedents, or the advent of new technology. Additionally, in certain cases, there may be terms the applicant selects arbitrarily and in this case, their meanings are described in a corresponding description part of the present invention. Accordingly, terms used in the present invention should be defined based on the meaning of the term and the entire contents of the present invention instead of the simple term name.

When it is described in the entire specification that one part "includes" some elements, it means that the one part may include only those elements, or include other elements as well as those elements if there is no specific limitation.

1. Battery Charging Capacity Controlling Method of Present Invention

Figure 2:
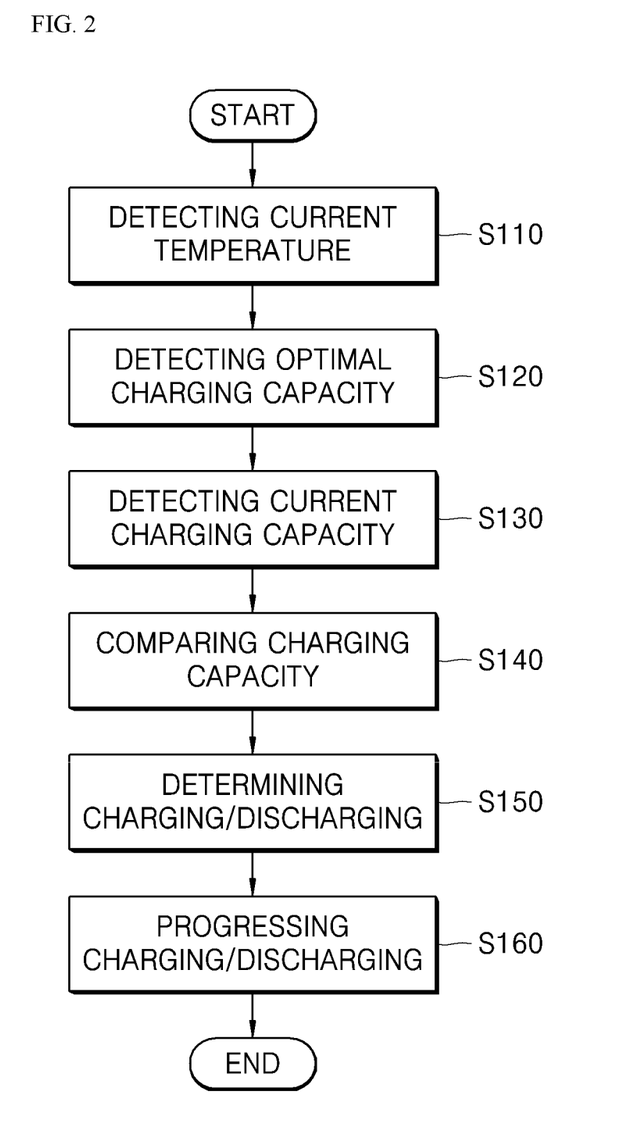
FIG. 2 is an overall flowchart of the present invention.

FIG. 2 is an overall flowchart of the present invention.

Hereinafter, a battery charging capacity control method of the present invention will be described with reference to FIG. 2.

In relation to a method for controlling a battery charging capacity according to temperature, the present invention includes a current temperature detection operation (S110) of measuring a current temperature, an optimal charging capacity detection operation (S120) of detecting an optimum charging capacity of the battery corresponding to each temperature, a current charging capacity detection operation (S130) of detecting a current charging capacity of the battery, a charging capacity comparison operation (S140) of comparing the optimum charging capacity with the current charging capacity, a charge/discharge determination operation (S150) of determining charge/discharge of the battery according to a result of the charging capacity comparison operation (S140), and a charge/discharge progress operation (S160) of charging/discharging the battery according to the charge/discharge determination operation (S150).

Figure 3:
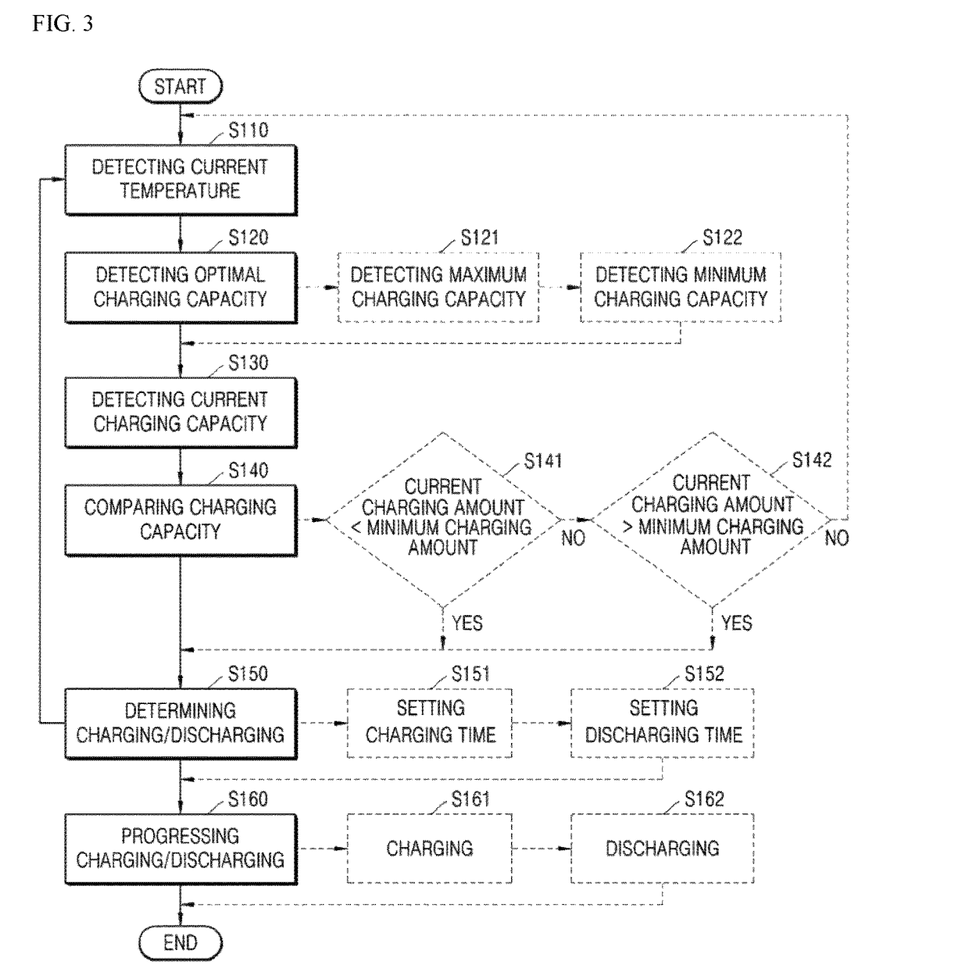
FIG. 3 is a detailed flowchart of the present invention.

Hereinafter, the operations will be described in detail with reference to FIG. 3.

The current temperature detection operation (S110) is an operation of measuring the current temperature and heat of a battery using a temperature measurement module. The reason for measuring the current temperature and heat of the battery is that, if the same battery is used, the charging capacity of the battery is changed depending on the temperature and heat of the battery and due to this, the full charging capacity is changed.

Meanwhile, the optimal charging capacity detection operation (S120) is an operation of detecting the charging capacity of the battery optimized to a predetermined temperature among the charging capacity of the battery which is changed due to a change in temperature and heat of the battery.

More specifically, it includes a maximum charging capacity detection operation (S121) of detecting the maximum charging capacity corresponding to the temperature measured in the current temperature detection operation (S110) from an optimal charging capacity table stored in a memory and a minimum charging capacity detection operation (S122) of detecting the minimum charging capacity.

The maximum charging capacity detection operation (S121) is an operation of detecting the maximum charging capacity at which the battery does not become overcharged at the current temperature from the optimum charging capacity table stored in the memory.

Moreover, the minimum charging capacity detection operation (S122) is an operation of detecting the minimum charging capacity of the battery capable of providing the minimum output meeting the user's demand at the current temperature from the optimum charging capacity table stored in the memory.

Meanwhile, the current charging capacity detection operation (S130) is an operation of measuring the current charging capacity of the battery based on the output voltage and current of the battery using the charging capacity measurement module or detecting the current charging capacity of the battery from a BMS.

Meanwhile, the charging capacity comparison operation (S140) is an operation of comparing the maximum charging capacity and the minimum charging capacity detected in the optimal charging capacity detection operation (S120) with the current charging capacity of the battery detected in the current charging capacity detection operation (S130).

If the current charging capacity of the battery is a value between the maximum charging capacity and the minimum charging capacity detected in the optimal charging capacity detection operation (S120), it is determined that the charging capacity is appropriate for the current temperature, so that no separate signal is generated.

However, when the current charging capacity of the battery measured in the current charging capacity detection operation (S130) is compared with the maximum charging capacity detected in the optimal charging capacity detection operation (S120), if the current charging capacity of the battery is greater, It is determined that the battery is overcharged at the corresponding temperature so that a discharging request signal is generated. On the other hand, when the current charging capacity of the battery measured in the current charging capacity detection operation (S130) is less than the minimum charging capacity detected in the optimal charging capacity detection operation (S120), it is determined that the corresponding battery is in a state not outputting the minimum output desired by the user so that a charging request signal is generated.

Meanwhile, when the discharging request signal is generated in the charging capacity comparison operation (S140), the charge/discharge determination operation (S150) sets a predetermined discharge time based on the current charging amount of the battery (S151) and operates a discharging switch to connect the battery to a discharging circuit.

On the other hand, when the charging request signal is generated in the charging capacity comparison operation, the predetermined charging time (S152) is set based on the current charging amount of the battery and operates a charging switch to connect the battery to a charging circuit.

Meanwhile, the charge/discharge progress operation (S160) is an operation of discharging (S162) or charging (S161) for a predetermined time set in the charge/discharge determination operation.

2. Battery Charging Capacity Controlling Device of Present Invention

Figure 4:
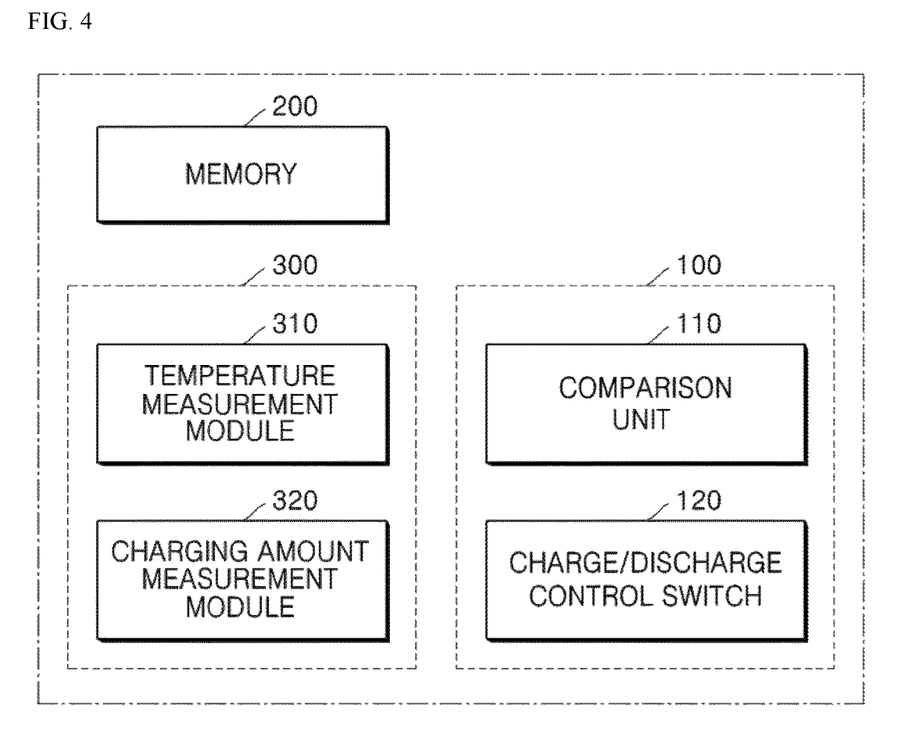
FIG. 4 is a configuration view according to a first embodiment of the present invention.

FIG. 4 is a configuration view of a battery charging capacity controlling device according to a first embodiment of the present invention.

Hereinafter, the battery charging capacity controlling device according to the first embodiment of the present invention is described with reference to FIG. 4.

The battery charging capacity controlling device according to the first embodiment of the present invention includes a control unit 100 for controlling the charging capacity of a battery, a memory 200 for storing an optimum charging capacity table corresponding to a temperature, and a measuring unit 300 for measuring the temperature and current charging capacity of the battery.

More specifically, the control unit 100 is configured including a comparison unit 110 for comparing the current charging capacity of the battery measured by the measurement unit 200 with an optimal charging capacity table corresponding to the measured temperature, and a charge/discharge control switch 120 for controlling the battery to be in a charge or discharge state according to a charge or discharge signal generated by the comparison unit 110.

Figure 5:
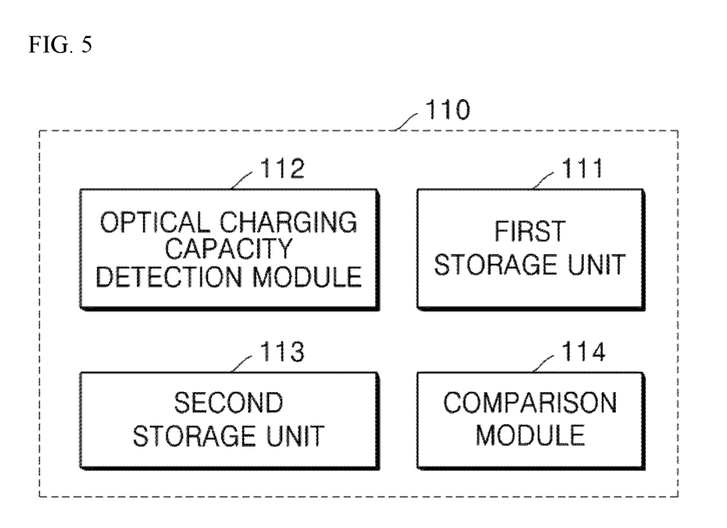
FIG. 5 is a detailed configuration view according to a first embodiment of the present invention.

Hereinafter, the comparison unit 110 will be described in more detail with reference to FIG. 5.

The comparison unit 110 is configured including a first storage unit 111 for storing the current charging capacity of the battery measured by the measurement unit 200, an optimum charging capacity detection module 112 for detecting an optimum charging capacity corresponding to the current temperature in an optimum charging capacity table corresponding to the temperature, a second storage unit 113 for storing the optimal charging capacity detected by the optimal charging capacity detection module, and a comparison module 114 for comparing the current charging capacity of the battery with the optimum charging capacity corresponding to the current temperature.

The optimal charging capacity means the minimum charging capacity at which the battery can output the minimum output that meets the user's demand and the maximum charging capacity within a range that does not damage the battery.

Referring to FIG. 1, when the charging capacity and the output of the battery are examined, it may be seen that the output of the battery increases as the charging capacity increases.

When the charging capacity of the battery is increased and maintained in a fully-charged high voltage state for a long time, deterioration of the battery accelerates and the life expectancy deteriorates rapidly.

Figure 7:
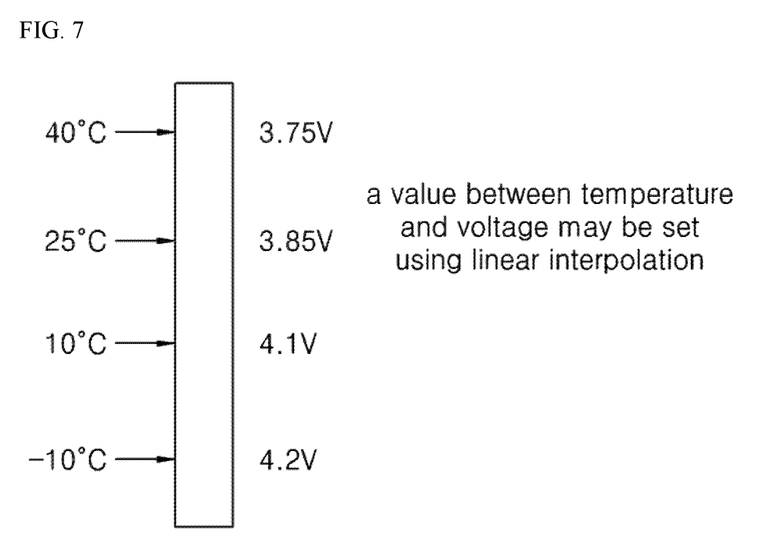
FIG. 7 is an embodiment of a temperature-voltage relationship of the present invention.

In order to prevent such a long-time maintenance of the full-charged high voltage state, it is necessary to maintain a proper temperature-voltage relationship as shown in FIG. 7.

Such a temperature-voltage relation may be set by adjusting the charging capacity to a value within the range of the minimum charging capacity at which the output of the battery requested by the user is possible and the maximum charging capacity that does not damage the battery.

For example, as shown in FIG. 7, a value between temperature and voltage may be set using linear interpolation.

The comparison module 114 compares the current charging capacity and minimum charging capacity of the battery, and if the current charging capacity of the battery is smaller according to a result of the comparison, since the current charging capacity of the battery is insufficient to satisfy the output requirement of the user, a predetermined charging time required for charging is calculated and a charging request signal is generated. On the other hand, if the charging capacity of the battery is larger, the current charging capacity of the current battery is compared with the charging capacity of the maximum battery, and if the current charging capacity of the battery is smaller according to the result, since the charging capacity of the battery is between the minimum charging capacity and the maximum charging capacity, so no additional signal is generated, but if the present charging capacity of the battery is larger according to the comparison result, since the charging capacity of the battery exceeds the maximum charging capacity, a predetermined discharge time required for discharging is calculated, and a discharge signal is generated.

Meanwhile, the memory 200 stores the optimal charging capacity table. As described above, the optimal charging capacity means the minimum charging capacity at which the battery can output the minimum output that meets the user's demand and the maximum charging capacity within a range that does not damage the battery. The minimum charging capacity and the maximum charging capacity have different values for each battery, and as a method of detecting the values, the same conditions except the temperature may be set with the same battery, and the values may be obtained through charging/discharging experiments while changing the temperature.

On the other hand, the measurement unit 300 is configured including a temperature measurement module 310 for measuring the temperature and a charging capacity measurement module 320 for measuring the charging capacity of the battery.

The temperature measurement module 310 measures the temperature and heat of the battery and the temperature value measured by the temperature measurement module 310 is stored in the memory 200 or directly transferred to the controller 100 so that it may be used for an optimal charging capacity detection.

The charging capacity measurement module 320 measures the voltage and current of the battery with a configuration of measuring the current charging capacity of the battery so that more specifically, based on this, it measures a charging capacity. Then, the measured current charging capacity of the battery is compared with the optimal charging capacity in the comparison unit 110 of the control unit 100.

Figure 6:
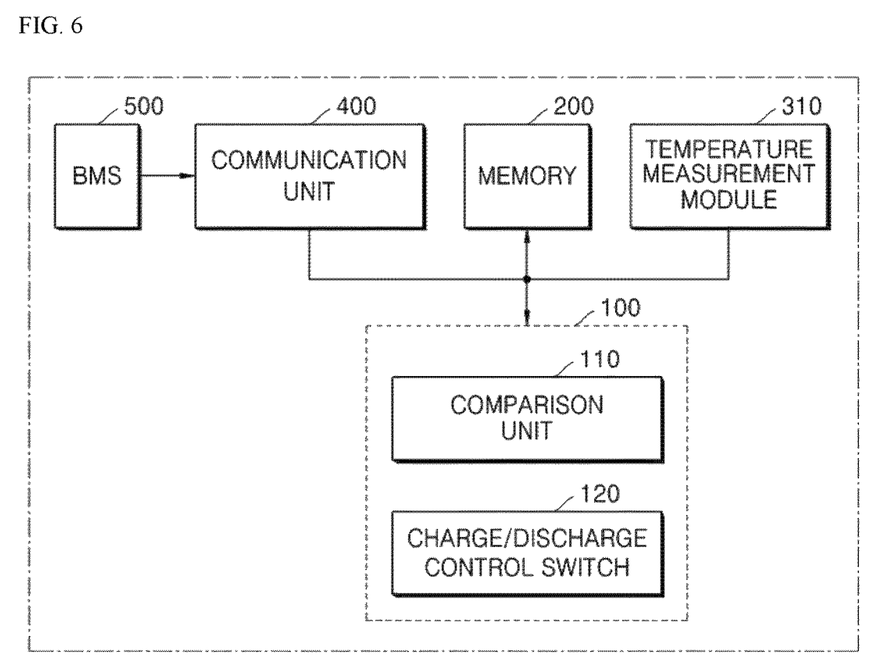
FIG. 6 is a configuration view according to a second embodiment of the present invention.

FIG. 6 is a configuration view of a battery charging capacity controlling device according to a second embodiment of the present invention.

Hereinafter, the battery charging capacity controlling device according to the second embodiment of the present invention is described with reference to FIG. 6.

The battery charging capacity controlling device according to the second embodiment of the present invention is configured including a control unit 100 for controlling the charging capacity of a battery, a memory 200 for storing an optimal charging capacity table corresponding to a temperature, a temperature measurement module 310 for measuring a temperature, and a communication unit 400 communicating with a BMS 500 to receive the current charging capacity of the battery.

More specifically, the control unit 100 is configured including a comparison unit 110 for comparing the optimum charging capacity detected in the optimal charging capacity table corresponding to the current temperature measured by the temperature measurement module 310 and the current charging capacity measured by the BMS 500, and a charge/discharge control switch 120 for controlling the battery to be in a charge or discharge state according to a charge or discharge signal generated by the comparison unit 110.

More specifically, when the comparator 110 is described with reference to FIG. 5, the comparator 110 is configured including an optimal charging capacity detection module for detecting an optimal charging capacity corresponding to the current temperature measured by the temperature measurement module 310, a second storage unit for storing an optimal charging capacity detected by the optimal charging capacity detection module, and a comparison module for comparing the current charging capacity of the battery measured by the BMS 500 and transmitted to the controller 100 through the communication unit 400 with the optimal charging capacity corresponding to the current temperature.

The optimal charging capacity means the minimum charging capacity at which the battery can output the minimum output that meets the user's demand and the maximum charging capacity within a range that does not damage the battery.

The comparison unit compares the current charging capacity and minimum charging capacity of the battery, and if the charging capacity of the battery is smaller according to the result of the comparison, since the current charging capacity of the battery is insufficient to satisfy the output requirement of the user, a predetermined charging time required for charging is calculated and a charging request signal is generated. On the other hand, if the charging capacity of the battery is larger, the current charging capacity of the current battery is compared with the charging capacity of the maximum battery, and if the current charging capacity of the battery is smaller according to the result, since the charging capacity of the battery is between the minimum charging capacity and the maximum charging capacity, so no additional signal is generated, but if the present charging capacity of the battery is larger according to the comparison result, since the charging capacity of the battery exceeds the maximum charging capacity, a predetermined discharge time required for discharging is calculated, and a discharging request signal is generated.

Meanwhile, the memory 200 stores the optimal charging capacity table in which the optimal charging capacity is recorded for each temperature.

The optimal charging capacity means the minimum charging capacity at which the battery can output the minimum output that meets the user's demand and the maximum charging capacity within a range that does not damage the battery.

Referring to FIG. 1, when the charging capacity and the output of the battery are examined, it may be seen that the output of the battery increases as the charging capacity increases.

When the charging capacity of the battery is increased and maintained in a fully-charged high voltage state for a long time, deterioration of the battery accelerates and the life expectancy deteriorates rapidly.

In order to prevent such a long-time maintenance of the full-charged high voltage state, it is necessary to maintain a proper temperature-voltage relationship.

Such a temperature-voltage relation may be set by adjusting the charging capacity to a value within the range of the minimum charging capacity at which the output of the battery requested by the user is possible and the maximum charging capacity that does not damage the battery.

For example, as shown in FIG. 7, a value between temperature and voltage may be set using linear interpolation.

As described above, the optimal charging capacity means the minimum charging capacity at which the battery can output the minimum output that meets the user's demand and the maximum charging capacity within a range that does not damage the battery. The minimum charging capacity and the maximum charging capacity have different values for each battery, and as a method of detecting the values, the same conditions except the temperature may be set with the same battery, and the values may be obtained through charging/discharging experiments while changing the temperature.

On the other hand, the temperature measurement module 310 measures the temperature and heat of the battery and the temperature value measured by the temperature measurement module is stored in the memory 200 or directly transferred to the controller 100 so that it may be used for an optimal charging capacity detection.

The communication unit 400 communicates with the BMS 500 to transmit the current charging capacity of the battery periodically measured by the BMS 500 to the control unit 100. Then, the measured current charging capacity of the battery is compared with the optimal charging capacity in the comparison unit 110 of the control unit 100.

On the other hand, although the technical idea of the present invention is specifically described with reference to the above embodiments, it should be noted that the above embodiments are for the purpose of explanation and not for the purpose of limitation. It will be apparent to those skilled in the art that various modifications and variations can be made in the present invention without departing from the spirit and scope of the invention.

What is claimed is:

1. A method of controlling a battery charging capacity of a battery for uninterruptible power supply according to a temperature, the method comprising:
    a current temperature detection operation of measuring a current temperature;
    an optimal charging capacity detection operation of detecting an optimal charging capacity of the battery corresponding to each temperature;
    a current charging capacity detection operation of detecting a current charging capacity of the battery;
    a charging capacity comparison operation of comparing the optimal charging capacity with the current charging capacity;
    a determination operation of determining a charging and discharging of the battery according to a result of the charging capacity comparison operation; and
    a progress operation of charging and discharging the battery according to a result of the determination operation to adjust the charging capacity so that a linear temperature-voltage relationship is set.

2. The method of claim 1, wherein the optimal charging capacity detection operation comprises:
    a maximum charging capacity detection operation of detecting a maximum charging capacity for each predetermined temperature corresponding to a temperature; and
    a minimum charging capacity detection operation of detecting a minimum charging capacity for each predetermined temperature corresponding to a temperature,
    wherein the charging capacity comparison operation comprises comparing the current charging capacity with the maximum charging capacity and the minimum charging capacity; and
    wherein the charging capacity is adjusted within the range of the minimum charging capacity to the maximum charging capacity.

3. The method of claim 2, wherein the determination operation transmits a signal for discharging the battery to a control unit if the current charging capacity of the battery is greater than the maximum charging capacity according to a result of the charging amount comparison operation, and transmits a signal for charging the battery to the control unit if the current charging capacity of the battery is less than the minimum charging capacity according to the result of the charging capacity comparison operation.

4. A battery charging capacity controlling device for controlling a battery for uninterruptible power supply according to a temperature, the device comprising:
    a measurement unit configured to measure a temperature and a current charging capacity of the battery;
    a control unit configured to detect an optimal charging capacity of the battery corresponding to each temperature, compare the optimal charging capacity with the current charging capacity, and control the charging capacity of the battery so that a linear temperature-voltage relationship is set; and
    a memory configured to store the optimal charging capacity table corresponding to a temperature.

5. The device of claim 4, wherein the control unit comprises:
    a comparison unit configured to compare the optimal charging capacity table with the current charging capacity of the battery; and
    a control switch configured to control the battery to be in a charge or discharge state according to a result of the comparison unit.

6. The device of claim 5, wherein the comparison unit comprises:
    a first storage unit configured to store the current charging capacity of the battery measured in the measurement unit;
    an optimal charging capacity detection module configured to detect the optimal charging capacity corresponding to the current temperature from the optimal capacity measurement table of the memory; and
    a second storage unit configured to store the optimal charging capacity corresponding to the current temperature; and
    a comparison module configured to compare the current charging capacity of the battery with the optimal charging capacity corresponding to the current temperature and generate a charge or discharge signal according to the result of the comparison.

7. The device of claim 4, wherein the measurement unit comprises:
    a temperature measurement module configured to measure the temperature and heat of the battery; and
    a charging capacity measurement module configured to measure the current charging capacity of the battery.

8. A battery fully-charged voltage condition controlling device according to a temperature, the device comprising the battery charging capacity controlling device of claim 4, further comprising
    a communication unit configured to receive the current charging capacity of the battery via communication with a BMS.

* * * * *